(12) United States Patent
Buerge et al.

(10) Patent No.: US 8,362,117 B2
(45) Date of Patent: Jan. 29, 2013

(54) METHOD FOR STABILIZING POLYCARBOXYLATES

(75) Inventors: Christian Buerge, Schafisheim (CH);
Ueli Sulser, Unterengstringen (CH);
Franz Wombacher, Jonen (CH); Dieter Honert, Dielheim (DE); Oliver Blask, Oftersheim (DE)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/041,856

(22) Filed: Mar. 7, 2011

(65) Prior Publication Data

US 2011/0213054 A1 Sep. 1, 2011

Related U.S. Application Data

(63) Continuation of application No. PCT/EP2009/061482, filed on Sep. 4, 2009.

(30) Foreign Application Priority Data

Sep. 5, 2008 (EP) .................................. 08163792

(51) Int. Cl.
*C08K 3/00* (2006.01)
*C08J 3/00* (2006.01)
(52) U.S. Cl. ........................................... 524/5; 524/522
(58) Field of Classification Search .............. 524/5
See application file for complete search history.

(56) References Cited

U.S. PATENT DOCUMENTS

| | | | | |
|---|---|---|---|---|
| 6,573,316 B1 * | 6/2003 | Albrecht et al. | ................. | 524/96 |
| 6,620,879 B1 * | 9/2003 | Albrecht et al. | ................. | 524/522 |
| 2003/0005861 A1 * | 1/2003 | Dietrich et al. | ................. | 106/727 |
| 2006/0287411 A1 * | 12/2006 | Bechtold | ...................... | 523/122 |
| 2009/0029896 A1 * | 1/2009 | Chapple | ........................ | 510/276 |

FOREIGN PATENT DOCUMENTS

| | | |
|---|---|---|
| DE | 198 43 730 A1 | 3/2000 |
| DE | 199 05 488 A1 | 8/2000 |
| DE | 100 15 135 A1 | 10/2001 |
| EP | 1 061 089 B1 | 12/2000 |
| EP | 1 138 697 A1 | 10/2001 |
| EP | 1 260 490 A1 | 11/2002 |
| EP | 1 348 729 A1 | 10/2003 |
| WO | WO 95/09821 A2 | 4/1995 |
| WO | WO 97/35814 A1 | 10/1997 |
| WO | WO 2005/090416 A1 | 9/2005 |

OTHER PUBLICATIONS

International Search Report (PCT/ISA/210) dated Oct. 9, 2009.
Written Opinion (PCT/ISA/237)Oct. 9, 2009.

* cited by examiner

*Primary Examiner* — Hui Chin
(74) *Attorney, Agent, or Firm* — Buchanan Ingersoll & Rooney, P.C.

(57) ABSTRACT

This disclosure relates to stabilizing polycarboxylates, such polycarboxylate ethers, in a presence of an inorganic powder at an elevated temperatures by using at least one antioxidant.

23 Claims, No Drawings

METHOD FOR STABILIZING POLYCARBOXYLATES

RELATED APPLICATIONS

This application claims priority as a continuation application under 35 U.S.C. §120 to PCT/EP2009/061482, which was filed as an International Application on Sep. 4, 2009 designating the U.S., and which claims priority to European Application 08163792.8 filed in Europe on Sep. 5, 2008. The entire contents of these applications are hereby incorporated by reference in their entireties.

FIELD

This disclosure relates to the field of additives for hydraulically setting systems, such as dispersing agents for concrete compositions. The disclosure also relates to stabilizing polycarboxylates in the presence of inorganic powder at elevated temperatures by using at least one antioxidant. Moreover, the disclosure relates to producing of temperature-stable polycarboxylates and use thereof during storage with inorganic powder, or during milling of inorganic powder and optionally subsequent storage.

BACKGROUND INFORMATION

Polymers that consist of $\alpha$-$\beta$-unsaturated carboxylic acids with polyoxyalkylene side chains, so-called polycarboxylates, have been used in concrete technology as dispersing agents, such as high-power liquefiers because of their strong water reduction. These polymers have a comb polymer structure. With the same water/cement (w/c) value, these polymers can improve processibility of the concrete, or, with the same processibility, reduce the water demand and thus the w/c value, which can lead to an increase in compressive strength and tightness.

The known polycarboxylates are only conditionally stable at elevated temperatures and decompose within days, such that they can no longer exert their action. It has been shown that the action of polycarboxylates greatly decreases when they are used at elevated temperatures in the presence of inorganic powders, such as hydraulic binders. This can occur, for example, in the storage of hydraulic binders or during milling of hydraulic binders.

During storage, in many cases the hydraulic binders are stored in silos at above 80° C., and even often at above 120° C. Moreover, high pressures can place special demands on the stabilization of polymers, and can be present in silos, such as in high silos. If polycarboxylates are added to the binder in advance, which can be in the desirable production of production mixtures, for example cement production mixtures, the mode of action of polycarboxylates greatly decreases after storage at high temperatures.

Polycarboxylates are also partially used as milling adjuvants during milling of hydraulic binders, for example clinker bricks. Since high temperatures are also present during milling, the known polycarboxylates can be decomposed to a large extent, and their action is no longer exerted.

Stabilizers are known that can be used for the stabilization of polymers, such as in polymer production or with use as adhesive. During polymer production or in adhesive, however, completely different conditions are present than when the polymers are used in the presence of inorganic powders. In the presence of inorganic powders, polycarboxylates are distributed over a large surface area. As a result, they are more fragile and are more quickly decomposed. In addition, this makes it difficult to stabilize polycarboxylates, such as at elevated temperatures.

It would therefore be desirable to develop a method for stabilization of polycarboxylates, so that polycarboxylates can be kept stable even in the case of a higher temperature in the presence of inorganic powders.

SUMMARY

A method for stabilizing polycarboxylates is disclosed comprising: elevating a temperature of a polycarboxylate polymer and an associated inorganic powder; and mixing the polycarboxylate polymer with at least one antioxidant before, during and/or after the elevating.

DETAILED DESCRIPTION

A method is disclosed that can stabilize polycarboxylate polymers, such as polycarboxylate ethers, in the presence of inorganic powder at elevated temperatures, and that is suitable to produce temperature-stable polymers.

It has been found, surprisingly, that this can be achieved by a method as disclosed herein. It can now be determined that polycarboxylates, such as polycarboxylate ether (PCE) polymers, with antioxidants, such as with antioxidants comprising at least one substituted phenol, can be stabilized, and even at elevated temperatures in the presence of inorganic powder, their action can be maintained over a longer time. It is especially surprising that particular antioxidants, such as those which comprise at least one substituted phenol, can be especially suitable to stabilize polycarboxylates, which are distributed in the mixture with an inorganic powder over a large surface area in contrast to pure polymer mixtures, in which the polymers are concentrated in mass.

Moreover, exemplary antioxidants that are used according to the disclosure can offer a long-term protection at high temperatures over several weeks or even months. In addition, it has been shown that polymers that are stabilized in this way can also still exert their action as dispersing agents, such as liquefiers, after they are exposed to high temperatures during the milling process or in extended storage.

Methods disclosed herein for stabilizing polycarboxylates, such as polycarboxylate ethers (PCE) in the presence of inorganic powder at elevated temperatures, can therefore include a polycarboxylate polymer mixed with at least one antioxidant.

The inorganic powder, in the presence of which polycarboxylates are stabilized, can be a mineral binder, a hydraulic binder that is selected from the cement group, such as Portland cements or aluminous cements, and their respective mixtures with flue ash, silica fume, slag, granulated cinders and lime rock fillers or fired chalk, clinker brick, a latent hydraulic powder, inert microscopic powder, or gypsum.

The term "stabilization" is defined, for example, as polycarboxylates not being degraded over an extended period and thus their action being maintained. The stabilization of the polycarboxylate polymer is, for example, maintained for at least one week, preferably at least 4 weeks in exemplary embodiments.

The term "elevated temperature" is defined as a temperature of at least 40° C., preferably, for example, 80 to 160° C. For example, after the burning process at above 1,000° C., cement clinker bricks can be cooled to a temperature of approximately (e.g., ±10%) 100 to 200° C. and normally stored at a temperature of approximately 80 to 150° C., such as at approximately 80 to 120° C., for example in silos. Thus, an "elevated temperature" is present, for example, during the storage of inorganic powder, for example during the storage of cement or cement clinker bricks.

The "elevated temperature" can also occur during milling of inorganic powder.

In an exemplary embodiment according to the disclosure, the at least one antioxidant is applied when conveying inorganic powder, such as when conveying cement, to the inorganic powder. For example, the inorganic powder, such as cement, is mixed (e.g., coated) during the conveying process, for example in transport channels, to depots, for example to the silo or to transport means (e.g., a truck), with at least one antioxidant.

An exemplary method for stabilizing polycarboxylates, such as polycarboxylate ethers (PCE), according to the disclosure, which comprises mixing the polycarboxylate polymer before, during or after the addition of the polycarboxylate polymer to the inorganic powder with at least one antioxidant, and maintaining the stabilization for at least one week (e.g., at least 4 weeks), at temperatures of at least 40° C., preferably at least 80° C., and still more preferably at least 100° C. in exemplary embodiments.

In another exemplary embodiment, at least one antioxidant is added to the inorganic powder before the milling of the inorganic powder, such as before the milling of the cement clinker brick.

The antioxidant can be added to the inorganic powder simultaneously, before or after polycarboxylate.

In an exemplary embodiment, the antioxidant is mixed in advance with polycarboxylate, and this mixture is then mixed with the inorganic powder at a desired time during the production process of the inorganic powder, such as cement, for example before the milling or during conveying of the inorganic powder before the storage, or applied to the inorganic powder, such that, for example, an inorganic powder is produced, which is coated with the mixture that comprises (e.g. consists of) polycarboxylate and antioxidant. The conveying or the transport of the inorganic powder can be carried out with devices known to those skilled in the art, for example via air grooves, where transport is carried out pneumatically and gravimetrically. The milling process can be carried out in a cement mill, for example in a ball mill. In addition, other mills, as they are known in the cement industry, can also be used.

It is also possible that the antioxidant can be incorporated by polymerization into polycarboxylate such that the comb polymer contains the antioxidant as a side chain. This can be carried out, for example, in the production of polycarboxylate, for example via polymer-like esterification or radical polymerization, such as via radical polymerization.

The antioxidant can, for example, be used in an amount of 0.01 to 50% by weight, preferably 0.1 to 20% by weight, especially preferably 1 to 15% by weight, relative to the total weight of the polycarboxylate polymer.

The polycarboxylate polymer or the additive, which can be added in an amount of, for example, 0.001 to 10% by weight, relative to the weight of the inorganic powder, such as to the weight of the binder.

The antioxidant can be added in an amount of, for example, 0.0001 to 1% by weight, especially preferably in an amount of 0.0001 to 0.01% by weight, relative to the weight of the inorganic powder, such as to the weight of the binder.

The antioxidant can also be added to the inorganic powder separately from the polycarboxylate polymer. For example, it can be suitable that first the polycarboxylate polymer is added to the inorganic powder, and then the antioxidant is added to the inorganic powder.

Suitable antioxidants are selected, for example, from the group of substituted phenols, such as sterically inhibited phenols or hydroquinones, sterically inhibited amines such as diarylamines, arylamine-ketone condensation products, organosulfur compounds, such as dialkyldithiocarbamic acids, or dialkyldithiophosphites, organophosphorus compounds such as phosphites or phosphonites, tocopherols, or derivatives thereof, gallic acid or derivatives thereof, vanillin, or salts or mixtures of the previously mentioned antioxidants.

Antioxidants that comprise at least one substituted phenol or one substituted aromatic amine are especially suitable. Sterically inhibited phenols or hydroquinones or sterically inhibited amines are especially suitable.

Examples of sterically inhibited phenols are 2-t-butyl-4,6-dimethylphenol, 2,6-di(t-butyl)-4-methylphenol (butylhydroxytoluene, BHT), 2-t-butyl-4-methoxyphenol (butylhydroxyanisole, BHA), pentaerythrityl-tetrakis-[3-(3,5-di-tert-butyl-4-hydroxyphenyl)-propionate] (Irganox® 1010), 2,6-dioctadecyl-4-methylphenol, 2,4,6-tri-t-butylphenol, ortho-tert-butylphenol, 3,5-bis(1,1-dimethylethyl)-4-hydroxybenzene-propionic acid ester of C4-C22-alcohols, 4,4'-butylidene-bis-(6-t-butyl-3-methylphenol), 4,4'-methylidene-bis-(2,6-di-t-butylphenol), 3,5-bis(1,1-di-tert-butyl)-4-hydroxyphenyl-propionic acid ester of C4-C22-alcohols, 2,2'-methylene-bis-(6-tert-butyl-4-methylphenol), 2,2-bis-(4-hydroxyphenyl)-propane (bisphenol A), 1,1-bis-(5-t-butyl-4-hydroxy-2-methylphenyl)-butane, 2,2'-methylene-bis-[4-methyl-6-(1-methylcyclohexyl)phenol], tetrakis[methylene-3-(3,5-di-t-butyl-4-hydroxyphenyl)-propionate]methane, N,N'-hexamethylenebis(3,5-di-t-butyl-4-hydroxyhydrocinnamic acid amide), octadecyl-3-(3,5-di-t-butyl-4-hydroxyphenyl)propionate, 1,3,5-tris-(3,5-di-t-butyl-4-hydroxybenzyl)isocyanurate, 1,1,3-tris-(5-t-butyl-4-hydroxy-2-methylphenyl)-butane, 1,3,5-tris-(3,5-di-t-butyl-4-hydroxybenzyl)mesitylene, ethyleneglycol-bis[3,3-bis(3'-t-butyl-4'-hydroxyphenyl)butyrate], di-(3-t-butyl-4'-hydroxy-5-methylphenyl)-dicyclopentadiene, 2,2'-methylene-bis-(4-methyl-6-cyclohexylphenol), 1,3,5-tri-(3,5-di-t-butyl-4-hydroxybenzyl)-2,4,6-trimethylbenzene (Irganox® 1330), 1,3,5-tris-(4-t-butyl-3-hydroxy-2,6-dimethylbenzyl)-isocyanurate, 3,5-di-t-butyl-4-hydroxyphenyl-propionic acid ester, 5-t-butyl-4-hydroxy-3-methylphenyl-propionic acid ester, 3,5-di-t-butyl-4-hydroxyphenyl-propionic acid amide, 3,5-di-(1,1-dimethylethyl)-4-hydroxybenzenepropionic acid ester, 1,6-hexanediol-bis-(3,5-di-t-butyl-4-hydroxyphenyl)propionate, triethylene glycol-bis-3-(t-butyl-4-hydroxy-5-methylphenyl)-propionate, 2,2-bis-(4-hydroxy-phenyl)-propane, 2,2'-thio-bis-(4-methyl-6-t-butylphenol), 2-methyl-4,6-bis((octylthio)-methyl)phenol (Irganox® 1520), 4,4'-thio-bis-(6-t-butyl-3-methylphenol), 2,2'-thiodiethyl-bis-3-(3,5-di-t-butyl-4-hydroxyphenyl)-propionate.

2,6-Di-t-butyl-4-methylphenol (BHT), octadecyl-3-(3,5-di-t-butyl-4-hydroxyphenyl)propionate, 2,2'-methylene-bis-(4-methyl-6-cyclohexyl-phenol), 2,2'-methylene-bis-(4-methyl-6-t-butylphyenol), triethylene glycol-bis-3-(t-butyl-4-hydroxy-5-methylphenyl)-propionate, 2,2-bis-(4-hydroxyphenyl)-propane and tetrakis[methylene-3-(3,5-di-t-butyl-4-hydroxyphenyl)-propionate]methane, or antioxidants, as they are marketed under the trade name Irganox® of the Ciba Spezialitätenchemie Company, in particular 2-methyl-4,6-bis((octylthio)-methyl)phenol (Irganox® 1520), pentaerythrityl-tetrakis-[3-(3,5-di-tert-butyl-4-hydroxyphenyl)-propionate] (Irganox® 1010), or 1,3,5-tri-(3,5-di-t-butyl-4-hydroxybenzyl)-2,4,6-trimethylbenzene (Irganox® 1330), are preferred.

Examples of sterically inhibited hydroquinones are 2,6-di-t-butyl-4-methoxyphenol, 2,5-di-t-butyl-hydroquinone.

Examples of sterically inhibited aromatic amines and arylamine-ketone condensation products are N,N'-bis-(1,4-dimethyl-pentyl)-p-phenylene-diamine, N,N'-diphenyl-phenylenediamine, 4-(p-toluene-sulfonamido)-diphenylamine, 4-n-butylaminophenol, 4,4'-di-t-octyldiphenylamine, 4,4'-di-(alpha,alpha-dimethylbenzyl)-diphenylamine, phenyl-beta-naphthylamine, N-isopropyl-N'-phenyl-p-phenylenediamine, N-phenyl-2-naphthylamine and/or phenyl-2-aminonaphthalene.

Examples of organosulfur compounds are 2,2'-thio-bis-(4-methyl-6-t-butylphenol), 2-methyl-4,6-bis((octylthio)-methyl)phenol (Irganox® 1520), 4,4'-thio-bis-(6-t-butyl-3-methylphenol), 2,2'-thiodiethyl-bis-3-(3,5-di-t-butyl-4-hydroxyphenyl)-propionate, 2,4-bis-(n-octylthio)-6-(4-hydroxy-3,5-di-t-butylanilino)-1,3,5-triazine, di-lauryl-3,3'-thiodipropionate, di-stearyl-3,3'-thiodipropionate, sodium dithionite, toluenesulfinic acid or derivatives thereof, for example sodium hydroxymethanesulfinate-dihydrate (Rongalite® C).

Examples of organophosphorus compounds are 3,5-di-t-butyl-4-hydroxybenzyl-phosphonic acid-dioctadecyl ester, trimethyl phosphite, triethyl phosphite, triphenyl phosphite, distearyl pentaerythritol diphosphite, tris-(nonylphenyl)-phosphite, tetrakis-(2,4-di-t-butylphenyl-4,4'-biphenylene-diphosphonite, tris-(2,4-di-t-butylphenyl)-phosphite, neopentyl glycol triethylene glycol diphosphite, diisodecyl pentaerythritol diphosphite, tristearyl phosphite, trilauryl phosphite, Na-hypophosphite or triphenyl phosphite.

In an exemplary embodiment, the antioxidant is a substituted phenol, such as a sterically inhibited phenol, for example as is available under the name Irganox® of the Ciba Company. The substituted phenol can, for example, be selected from the group that consists of butyl hydroxy toluene (BHT), butyl hydroxy anisole (BHA), bisphenol A, bisphenol F, salicylic acid, hydroquinone, vanillin, biphenyldiol, for example 4,4'-biphenyldiol or 2,2'-biphenyldiol, gallates and phenol polycondensates.

In this entire text, the term "polycarboxylate" is defined as a polymer that has carboxy groups. This disclosure encompasses use of polycarboxylate ether (PCE) comb polymers that have polyoxyalkylene side chains.

Especially suitable polycarboxylates can comprise at least one main chain that contains hydrocarbon groups, at least one side chain that comprises at least one acid group, such as a carboxylic acid group or a salt thereof, and at least one side chain that comprises at least one polyoxyalkylene group, whereby the polyoxyalkylene group is bonded to the main chain via a connecting piece, which comprises at least one ester, ether, amide and/or imide group, such as at least one ester or amide group, and still more preferably at least one ester and amide group. In addition to the carboxylic acid groups and the polyoxyalkylene groups, other functional or non-functional groups can be bonded to the main chain.

The connecting piece can comprise at least one ester, ether, amide or imide group, such as an ester or amide group, such as selected, for example, from the group that consists of —COO—, —CO—NH—, —R—COO—, and —R—CO—NH—, whereby R, independently of one another, stands for a $C_1$-$C_6$ alkylene radical. Polycarboxylate can comprise various side chains that comprise at least one polyoxyalkylene group and that are bonded to the main chain via various connecting pieces. For example, polycarboxylate can comprise side chains that are bonded to the main chain via an ester, ether, amide or imide group or mixtures thereof. In a polycarboxylate, ester, ether, amide or imide connecting pieces can thus be present in mixed form. Exemplary preferred polycarboxylates are those in which a portion of the side chains that comprises at least one polyoxyalkene group is bonded to the main chain via an ester group and another portion of the side chains that comprises at least one polyoxyalkylene group is bonded to the main chain via an amide group.

The polyoxyalkylene group is based on polymerized epoxide-containing compounds, such as, for example, ethylene oxide, propylene oxide, 1-butylene oxide or phenylethylene oxide. The side chain that comprises polyoxyalkylene groups preferably contains or consists of, for example, polyoxyethylene groups, polyoxypropylene groups or mixtures of oxyethylene and oxypropylene groups.

In an exemplary embodiment, the polycarboxylate can comprise:

a) At least one acid unit A of formula (I); and

b) At least one structural unit B of formula (II);

and optionally c) At least one additional structural unit C.

In this case, independently of one another, $R^1$ and $R^2$ stand for H, COOM, $CH_2COOM$ or an alkyl group with 1 to 5 carbon atoms, such as for H or $CH_3$; $R^3$, independently of one another, stands for H, $CH_3$, COOM or $CH_2COOM$, such as for H; and $R^4$, independently of one another, stands for a radical of carboxylic acid, such as for COOM; or $R^3$ can form a ring with $R^4$ to make —CO—O—CO—.

M means H, alkali metal, alkaline-earth metal or other divalent or trivalent metal atoms, ammonium, alkyl-ammonium or a mixture thereof, in particular H, Na, Ca/2, Mg/2, $NH_4$ or an organic ammonium. It will be clear to those skilled in the art that with the multivalent ions, another counterion should be present, which can also be a carboxylate of the same or a different molecule of the polymer P. The ammonium compounds can be, for example, tetraalkylammonium or else $HR_3N^+$, whereby R represents an alkyl group, such as a $C_1$- to $C_6$-alkyl group, preferably for example ethyl or butyl. Ammonium ions are obtained for example by the neutralization of the carboxyl group with commercially available tertiary amines.

$R^5$, independently of one another, stands for a radical of the formula (III)

$$—(CH_2)_x—R^7—(R^8O)_y—R^9 \qquad (III)$$

In this case, $R^7$, independently of one another, stands for an ester or amide connecting piece, such as for —COO— or —CO—NH—. $R^8$ stands for a $C_2$-$C_6$ alkylene group, such as a $C_2$-$C_4$ alkylene group, or a mixture of $C_2$, $C_3$ and/or $C_4$ alkylene groups in any sequence; and $R^9$ stands for H, a $C_1$-$C_{12}$ alkyl or cycloalkyl radical, a $C_7$-$C_{20}$ alkylaryl or aralkyl radical, or a substituted or unsubstituted aryl radical, or a monovalent organic radical with 1 to 30 C atoms, which optionally comprises heteroatoms.

$R^6$, independently of one another, stands for H, $CH_3$, COOM or $CH_2COOM$ or a substituent as defined for $R^5$, such as for H.

The index x, independently of one another, has the value 0 or 1; and y, independently of one another, stands for the value 3-250, for example 10 to 120.

Examples of suitable acid units A are units that are produced by polymerization from acrylic acid, methacrylic acid, mesaconic acid, citraconic acid, glutactonic acid, fumaric acid, maleic acid, maleaminic acid, itaconic acid, vinylbenzoic acid, crotonic acid, or derivatives or analogs thereof, such as, for example, the maleic acid semiamide that consists of maleic acid and sulfanilic acid, in particular the N-(4-sulfophenyl)maleic acid amide. Monocarboxylic acids are preferred in exemplary embodiments. For example, a unit that is produced by polymerization of a (meth)acrylic acid unit or a salt thereof can be especially suitable as acid unit A. In the entire existing document, "(meth)acrylic acid" is defined as both acrylic acid and methacrylic acid or mixtures thereof.

The at least one acid unit A of formula (I) can be partially or completely neutralized. The acid unit can be present as a free acid or as salt or partial salt, whereby the term "salt" here and below in addition to the known salts, as they are obtained by neutralization with a base, also comprises complex-chemical compounds between metal ions and the carboxylate or carboxyl groups as ligands.

The additional structural unit C can comprise another ether, ester, amide or imide unit, such as an amide or ester unit. For example, the additional structural unit C can comprise carboxylic acid, sulfonic acid, phosphoric acid ester, phosphonic acid, carbonylamidomethylpropanesulfonic acid and alkali or alkaline-earth salts thereof, poly(oxyalkylene) oxycarbonyl, poly(oxyalkylene)aminocarbonyl, poly(oxyalkylene)-oxyalkyl, poly(oxyalkylene)oxy, hydroxyethyloxycarbonyl, acetoxy, phenyl or N-pyrrolidonyl groups. The additional structural unit C can, for example, comprise polyoxyalkylene groups, such as polyoxyethylene groups, polyoxypropylene groups or mixtures thereof. For example, the structural unit C can be an ester unit, which is produced by reaction of a mono- or dicarboxylic acid with an alkyl alcohol, in particular a $C_6$-$C_{20}$ alkyl alcohol.

Polycarboxylate can have a combination of various structural units of the respective structural units of A, B, and optionally C. For example, several structural units A can be present in mixed form in polycarboxylate, for example, a mixture of methacrylic acid units with acrylic acid units; or, several different ester and/or amide units B can be present in mixed form in the polymer P, for example, several ester units B with different substituents $R^8$. For example, the common use of ester and amide units or the common use of different polyoxyalkylene groups, such as polyoxyethylene with polyoxypropylene, or the common use of polyoxyalkylene groups, for example polyoxyethylene, with different molecular weight, can be preferred.

In an exemplary embodiment, polycarboxylate can comprise at least one ester unit and at least one amide unit.

In an exemplary embodiment, polycarboxylate can comprise 10 to 90 mol %, preferably 20 to 80 mol %, of the acid unit A of formula (I), 10 to 90 mol %, preferably 20 to 80 mol % of the structural unit B of formula (II), and optionally 0 to 30 mol % of the structural unit C, in each case relative to the total molar amount of the structural units of A, B and C in polycarboxylate.

The sequence of the individual structural units A, B, and C in polycarboxylate can be alternating, static, block-by-block, or random.

Polycarboxylate can, for example, have a molecular weight $M_w$ in the range of 8,000-200,000 g/mol, preferably 15,000-100,000 g/mol, and especially preferably 25,000-80,000 g/mol.

In terms of the disclosure, 'molecular weight' or 'molar weight' is defined as the molecular weight means $M_w$.

Polycarboxylate can be produced in various ways. For example, at least two methods are used. In a first method, the polymers are produced in a so-called polymer-like reaction from a polycarboxylate and the respective alcohols and/or amines. In a second method, the polymers are produced from the respective unsaturated carboxylic acid-, and ester- and/or amide-functional monomers by radical polymerization.

Exemplary preferred polymers are produced after the polymer-like reaction according to the first method. In this case, a polymer that contains latent or free carboxyl groups is reacted with one or more compounds that contain amine or hydroxyl functions under conditions that result in partial amidation or esterification of carboxyl groups. The polymer-like reaction can have an advantage that very different comb polymers with very different properties can be obtained simply and reliably from commercially available polymers that consist of α-, β-unsaturated acids, such as mono- or dicarboxylic acids, especially poly(meth)acrylic acids, by variation of the amount, the type and the ratio of alcohol and amine. Such polymer-like reactions are described in, for example, WO97/35814A1, WO95/09821 A2, DE 100 15 135A1, EP 1138697A1, EP1348729A1 as well as WO2005/090416A1. Details for polymer-like reaction are disclosed in, for example, EP 1 138 697 B1 on page 7, line 20 to page 8, line 50, as well as in the examples thereof or in EP 1 061 089 B1 on page 4, line 54 to page 5, line 38 as well as in the examples thereof. Polycarboxylates can also be obtained in the solid aggregate state, as described in EP 1 348 729 A1 on page 3 to page 5 as well as in the examples thereof.

In a second production method, polycarboxylate is to be produced via the radical polymerization of unsaturated mono- or dicarboxylic acids with unsaturated carboxylic acid esters, unsaturated carboxylic acid amides, unsaturated carboxylic acid imides, allyl ether or vinyl ether. The carboxylic acids in the finished comb polymer can be present in the form of their free acid or completely or partially in the form of their salts. The radical polymerization path is the more common method; it can be hampered in the case of special compounds, however, by the commercial availability of the corresponding monomers and involve expensive monitoring of the process.

Polycarboxylate can be used both in liquid and in solid form, both alone or as a component of a dispersing agent, in particular a liquefier.

Polycarboxylate can thus be used as a simple polycarboxylate or as a mixture of several polycarboxylates. Also, however, one or more polycarboxylates can be used with other dispersing agents or dispersing agent mixtures.

Polycarboxylates or mixtures that contain polycarboxylates can contain additional components for use according to the disclosure. Examples of additional components are solvents or additives, such as other liquefiers, for example lignosulfonates, sulfonated naphthalene formaldehyde condensates, sulfonated melamine-formaldehyde condensates or polycarboxylate ethers (PCE), accelerators, retarding agents, shrinkage inhibitors, defoaming agents, or foaming agents.

If polycarboxylate is used in liquid form, a solvent can be used for the reaction. Exemplary preferred solvents are, for example, alcohols, such as ethanol or isopropanol, and water, whereby water can be a most preferred solvent. Depending on the type of polycarboxylate, a dispersion or a solution is produced. A solution can be preferred in exemplary embodiments.

The aqueous solution or dispersion can contain additional components. Examples of this are solvents or additives, as are known in construction chemistry, such as surfactants, stabilizers against heat and light, dyes, defoaming agents, accelerators, retarding agents, and foaming agents.

Polycarboxylate can also be present in the solid aggregate state. In terms of the disclosure, polymers in the solid aggregate state are defined as polymers that are present in the solid aggregate state at room temperature and are, for example, powder, scales, pellets, granulates or plates and can be easily transported and stored in this form.

The at least one antioxidant can be a component of a polymer mixture, such as a polymer solution, or can be added separately in solid or liquid form to polycarboxylate or to inorganic powder, or can be ground together with polycarboxylate and inorganic powder.

In another aspect, this disclosure relates to the use of at least one antioxidant for the production of temperature-stable polycarboxylate polymers in the presence of inorganic powder at elevated temperatures.

To produce temperature-stable polycarboxylate polymers, which are also stable in the presence of inorganic powder at elevated temperatures, the polycarboxylate polymer is mixed before, during or after the addition of the polymer to the inorganic powder with at least one antioxidant.

The antioxidant can be added to the inorganic powder together with polycarboxylate. This addition can, for example, take place before the milling process or during the conveying of the inorganic powder to the depot.

It has been shown that antioxidants can be especially suitable to stabilize polycarboxylates, such as polycarboxylate ethers, which are used in the presence of inorganic powders, such as cement, even at elevated temperatures. It is surprising that particularly substituted phenols or substituted aromatic amines are especially suitable to stabilize polycarboxylates that are present distributed in inorganic powder over a large surface area. Then, special conditions are present in the presence of inorganic powders, such as, for example, the above-mentioned elevated temperatures, as well as the presence of a large surface area, in which a possible stabilization of polycarboxylates is hampered. Polycarboxylates can decompose under these conditions, and known stabilizers are not suitable to stabilize polycarboxylates. It has even been shown that with the antioxidants that are used according to the disclosure, a stabilization of polycarboxylates can be achieved under especially exacting conditions, when, for example, polycarboxylates are added to the cement before the milling process and then are also exposed to elevated temperatures and high pressures during storage in cement silos.

It is also surprising that the stabilization action is maintained over an extended period, such as at least one week (e.g., at least 4 weeks), while the known stabilizing agents in most cases are suitable for stabilization under specific conditions, which are present only over a short time.

Examples

The disclosure is now explained in more detail based on the following examples:

1. Antioxidant that is Used

TABLE 1

| | Raw Materials that are Used | | |
|---|---|---|---|
| No. | Type | Name | Manufacturer |
| A-1 | 2-Methyl-4,6-bis((octylthio)-methyl)phenol | Irganox ® 1520 L | Ciba Specialty Chemical |
| A-2 | 2,2-Bis-(4-hydroxy-phenyl)-propane | Bisphenol-A | Nordmann, Rassmann GmbH |
| V-1 | Ascorbic Acid | | Fluka |
| V-2 | 4-Aminobenzoic Acid | | Fluka |

2. Mortar Tests

The effectiveness of the polymers according to the disclosure was tested in the mortar.

In a first step, Portland cement (Swiss CEM I 42.5R) was coated with a polycarboxylate-antioxidant mixture. To this end, cement was loaded via a funnel into a conveying device, which can comprise air grooves. With the help of compressed air, 0.3% by weight relative to the cement of an aqueous solution, which contains an aqueous solution of a polycarboxylate liquefier (for example Sika® ViscoCrete® 3082, available from Sika Schweiz AG) and an amount of an antioxidant that is indicated in Table 2 (relative to the aqueous solution of the polycarboxylate liquefier), was sprayed in the area of the air grooves and thus applied to the cement. The coated cement was further transported in a shipping container or a storage device and stored there at room temperature or at 90° C. for the time period indicated in Table 2.

After storage, the following mortar mixture was produced:

| Composition of the Mortar Mixture (MM): (Maximum Grain 8 mm) | Amount in g |
|---|---|
| Coated Portland Cement (Swiss CEMI 42.5 R) | 850 |
| Rock Fillers | 141 |
| Sand 0-1 mm | 738 |
| Sand 1-4 mm | 1,107 |
| Sand 4-8 mm | 1,154 |

The sand, the fillers, and the cement that is coated with polycarboxylate and antioxidants were mixed in dry form for 1 minute in a Hobart mixer. Within 30 seconds, the batching water was added and mixed for another 2.5 minutes. The total mixing time in wet form was 3 minutes. The water/cement value (w/c value) was 0.46. To determine effectiveness, the extent of spread (ABM) (Table 2) of the mortar was determined according to EN 1015-3 after 0, 30 and 60 minutes.

To determine the effectiveness of the antioxidants according to the disclosure, the cement was coated with the various antioxidants (see Table 2). Examples 1 to 9 represent examples according to the disclosure, while Examples 10 to 17 represent comparison examples.

TABLE 2

Extent of spread (ABM) of a mortar mixture in mm after 0, 30 and 60 minutes (min), after a storage of the coated cement at room temperature (RT) and at 90° C. of 0, 21 and 35 days (d).

| No. | Anti-oxi-dant | % by Weight of Antioxidant Relative to ViscoCrete ® 3082 | Days (d) after Storage Room Temperature | 90° C. | ABM (mm) 0 min | 30 min | 60 min |
|---|---|---|---|---|---|---|---|
| 1 | A-1 | 5% by Weight | 0 | 0 | 211 | 189 | 183 |
| 2 | A-1 | 5% by Weight | 35 |  | 213 | 184 | 177 |
| 3 | A-1 | 5% by Weight |  | 21 | 221 | 202 | 184 |
| 4 | A-1 | 5% by Weight |  | 35 | 200 | 180 | 165 |
| 5 | A-1 | 2.5% by Weight |  | 21 | 222 | 174 | 157 |
| 6 | A-2 | 5% by Weight | 0 | 0 | 202 | 176 | 173 |
| 7 | A-2 | 5% by Weight | 35 |  | 212 | 183 | 181 |
| 8 | A-2 | 5% by Weight |  | 21 | 201 | 172 | 168 |
| 9 | A-2 | 5% by Weight |  | 35 | 204 | 179 | 167 |
| 10 | V-1 | 5% by Weight | 0 | 0 | 203 | 175 | 173 |
| 11 | V-1 | 5% by Weight |  | 21 | 174 | 149 | 145 |
| 12 | V-2 | 0.4% by Weight | 0 | 0 | 204 | 169 | 161 |
| 13 | V-2 | 0.4% by Weight |  | 21 | 165 | 146 | 133 |
| 14 | — | — | 0 | 0 | 211 | 190 | 178 |
| 15 | — | — | 35 |  | 215 | 186 | 184 |
| 16 | — | — |  | 21 | 163 | 148 | 136 |
| 17 | — | — |  | 35 | 162 | 137 | 135 |

The results in Table 2 show that exemplary antioxidants according to the disclosure are suitable to stabilize polycarboxylates even at an elevated temperature (90° C.). At room temperature (RT), polycarboxylates can maintain their action after extended storage time (35 days) and show good liquefaction properties with a good extent of spread. If polycarboxylates are stored at an elevated temperature (90° C.), however, clear differences are seen between the examples with antioxidants according to the disclosure and the comparison examples without antioxidants.

The examples with antioxidants according to the disclosure have a desired extent of spread of over 200 mm even after three or four weeks (here, after 21 or 35 days), and confirm that polycarboxylates do not decompose even at an elevated temperature of 90° C., but their action can be maintained.

The comparison examples with the comparison stabilizer V-1 or V-2 have low values even after 21 days of storage at 90° C. In the comparison examples without antioxidants or stabilizers, the extent of spread drops below the desired 200 mm even after a few days, and it is thus shown that polycarboxylates can no longer exert their full action since they decompose during storage at 90° C.

Of course, exemplar embodiments as disclosed herein are not limited to the embodiments that are shown and described. It is understood that the features disclosed herein can be used not only in the respectively indicated combination, but also in other modifications, combinations and alterations or in a standalone fashion, without exceeding the scope of the invention.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for stabilizing polycarboxylates comprising:
   elevating a temperature of a polycarboxylate polymer and an associated inorganic powder,
     wherein the polycarboxylate polymer comprises:
       at least one acid unit; and
       at least one unit that comprises polyoxyalkylene groups,
     wherein the inorganic powder is a hydraulic binder comprising a Portland cement or an aluminous cement,
     wherein the polycarboxylate polymer is added in liquid form to the inorganic powder; and
   mixing the polycarboxylate polymer with at least one antioxidant before, during and/or after the elevating,
     wherein the at least one antioxidant is selected from the group consisting of: substituted phenols, sterically inhibited phenols, hydroquinones, sterically inhibited aromatic amines, diarylamines, arylamine-ketone condensation products, organosulfur compounds, dialkyldithiocarbamic acids, dialkyldithiophosphites, organophosphorus compounds, phosphites, phosphonites, tocopherols, organophosphorus compound derivatives, gallic acid, gallic acid derivatives, vanillin, salts, and any mixtures thereof.

2. The method according to claim 1, wherein the at least one antioxidant is a substituted phenol.

3. The method according to claim 2, wherein the substituted phenol is selected from the group consisting of:
   butyl hydroxy toluene, butyl hydroxy anisole, cresol, bisphenol A, bisphenol F, salicylic acid, hydroquinone, vanillin, biphenyldiol, gallates and phenol polycondensates.

4. The method according to claim 1, comprising:
   obtaining the polycarboxylate polymer by a polymer-like reaction of esterification of a polycarboxylic acid.

5. The method according to claim 1, wherein the inorganic powder is a mineral binder.

6. The method according to claim 1, wherein the elevated temperature is at least 40° C.

7. The method according to claim 1, wherein the antioxidant is used in an amount of 0.01 to 50% by weight relative to total weight of the polycarboxylate polymer.

8. The method according to claim 1, wherein the antioxidant is used in an amount of 0.1 to 15% by weight relative to total weight of the polycarboxylate polymer.

9. The method according to claim 1, wherein the antioxidant is added in an amount of 1 to 15% by weight relative to the total weight of the polycarboxylate polymer.

10. The method according to claim 1, wherein the antioxidant is added in an amount of 0.0001 to 1% by weight relative to the weight of the inorganic powder.

11. The method according to claim 1, wherein the antioxidant is added in an amount of 0.0001 to 0.01% by weight relative to the weight of the inorganic powder.

12. The method according to claim 1, wherein the polycarboxylate polymer is added in an amount of 0.001 to 10% by weight relative to the weight of the inorganic powder.

13. The method according to claim 1, comprising:
   elevating the temperature during storage of the inorganic powder which is coated with temperature-stabilized polycarboxylates.

14. The method according to claim 1, comprising:
   applying the at least one antioxidant on the inorganic powder when the inorganic powder is conveyed.

15. The method according to claim 1, comprising:
   elevating the temperature during milling of the inorganic powder.

16. The method according to claim 1, comprising:
maintaining stabilization of the polycarboxylate polymer for at least one week.

17. The method according to claim 1, comprising:
producing temperature-stable polycarboxylate in a presence of inorganic powder at the elevated temperature.

18. The method according to claim 17, wherein the at least one antioxidant is a substituted phenol, which is selected from the group consisting of butyl hydroxy toluene, butyl hydroxy anisole, cresol, bisphenol A, bisphenol F, salicylic acid, hydroquinone, vanillin, biphenyldiol, gallates and phenol polycondensates.

19. The method according to claim 1, wherein the inorganic powder further comprises at least one of: flue ash, silica fume, slag, granulated cinders, lime rock fillers, fired chalk, a latent hydraulic powder, inert microscopic powder, or gypsum.

20. The method according to claim 1, wherein the elevated temperature is at least 80° C.

21. The method according to claim 1, comprising:
maintaining stabilization of the polycarboxylate polymer for at least four weeks.

22. The method according to claim 18,
wherein the inorganic powder is a mineral binder, and the elevated temperature is at least 40°.

23. The method according to claim 1, wherein the polycarboxylate polymer in liquid form is provided with a solvent, and the polycarboxylate polymer is in solution form.

* * * * *